Patented Jan. 9, 1951

2,537,639

UNITED STATES PATENT OFFICE 2,537,639

STABILIZATION OF DICHLOROBUTADIENE RESINS

Eugene P. Stefl, Cuyahoga Falls, and Lloyd O. Bentz, Akron, Ohio, assignors to The Firestone Tire & Rubber Company, Akron, Ohio, a corporation of Ohio No Drawing. Application July 19, 1949, Serial No. 105,672

4 Claims. (Cl. 260—45.85)

1

This invention relates to the stabilization, against discoloration and other deterioration by light and oxidation, of resinous polymers and copolymers of 2,3-dichloro-1,3-butadiene, hereinafter referred to, for brevity, as "dichlorobutadiene." In general, the invention is based upon the discovery that the resistance to light of these polymers and copolymers may be greatly enhanced by the addition thereto of the reaction product of a bisphenol-A and salicyclic acid produced under esterifying conditions.

THE DICHLOROBUTADIENE RESINS

Referring first to the dichlorobutadiene polymers which may be stabilized in accordance with this invention, this compound has been polymerized heretofore to yield products aptly described as hard, infusible and insoluble. While such refractory resins may be stabilized in accordance with this invention, it has been discovered (Kuhn 2,514,195) that the intractable nature of the earlier dichlorobutadiene polymers is due to their excessive molecular weights and to a slight cross-linking which becomes significant at such high molecular weights. It has further been discovered (Kuhn 2,514,195) that, providing the polymers of dichlorobutadiene are prepared in such a manner that their molecular weight corresponds to an intrinsic viscosity of from 0.1 to 1.5, the polymers are fusible to yield fluid melts, are soluble in hot solvents and have crystalline properties similar to those of the nylon and vinylidene chloride resins—i. e., they may be extruded and cold-stretched to yield filaments, cordage etc., having excellent strength and flexibility and exhibiting oriented-crystalline X-ray patterns. These latter resins are clearly of great technical merit, and accordingly the invention is more particularly directed to the stabilization of such crystalline resins. However, it is to be understood that any polymers or copolymers of dichlorobutadiene (whether or not crystalline as above described) containing a sufficient amount of dichlorobutadiene (say from about 25% to 100% based on the total weight of resin) so that failure thereof under exposure to light occurs by mechanisms involving the polydichlorobutadiene structure, may be stabilized in accordance with this invention.

Some techniques which have been found to yield polymers of dichlorobutadiene having an intrinsic viscosity range of from 0.1 to 1.5 are:

1. A restrained chlorination of any infusible polymer or copolymer of dichlorobutadiene prepared in accordance with the prior art, the chlorine uptake being strictly confined to the range 2–10%, and preferably 3–5%, based on the weight of polymer. This degree of chlorination does not appear to alter the essential polymeric chain, but merely breaks up excessively long molecules, and the cross-linkages and side-structure attendant thereon.

2. The use of "modifying agents," as the term is used in the synthetic rubber industry, to include certain polymerization-controlling substances such as lauryl mercaptan, butyl mercaptan, thiophenols, hexamethylene dimercaptan, diisopropyl xanthogen disulfide. The inclusion, in the polymerization mass, of from 0.5 to 3.0%, or in the case of some of the less powerful modifiers, as high as 15% of these modifiers, based on the weight of monomers (including comonomers as detailed below) will develop highly crystalline properties in the resultant resins. This technique is applicable to solution, emulsion or mass polymerization. Recommended amounts of the various types of modifiers are as follows.

Table I

| Type of Modifier | Amount to be used (per cent, based on the weight of dichlorobutadiene in polymerization mass) |
|---|---|
| Aryl mercaptans (containing —SH groups directly attached to aromatic nuclei) | 0.05 to 2.0 |
| Aliphatic, cycloaliphatic, and araliphatic mercaptans (containing from 1 to 8 carbon atoms) | .5 to 5.0 |
| Aliphatic, cyloaliphatic and araliphatic mercaptans (containing from 9 to 20 carbon atoms) | 2 to 15 |

3. Polymerization in non-reacting organic solvents, e. g. toluene, benzene, methanol, ethanol, ether, hexane, etc. in concentrations from about 10% to about 60%, based on the total weight of solvent and dichlorobutadiene, at relatively elevated temperatures on the order of from about 40° to about 100° C., and in the presence of from about 0.1% to 5.0%, based on the total weight of polymerization mass, of a peroxidic catalyst such as benzoyl peroxide.

4. Polymerizing dichlorobutadiene or mixtures thereof with copolymerizable compounds in solution in organic solvents at temperatures in excess of 120° C., in the presence of inhibitors such as p-cresol employed to the extent of about 1%, based on the weight of dichlorobutadiene.

Of all of these techniques, that outlined under (2) is the most practical and reliable for the manufacture of resins for extrusion and orientation into filaments, to the stabilization of which the present invention is of especial application.

As noted above, the present invention may be applied to the stabilization of both of homopolymers of dichlorobutadiene and of copolymers thereof with unsaturated compounds copolymerizable therewith. Dichlorobutadiene is readily copolymerizable with a wide variety of unsaturated compounds which are themselves addition-polymerizable; and the stability of the resultant resins is materially enhanced by the addition of bisphenol-A salicylic acid adducts in accordance with this invention, provided that the dichloro-butadiene is present to an extent (say 25% to 100%, based on the weight of resin) such that the mechanism of degradation thereof contributes substantially to the ultimate failure of the resin. It is understood that, if the resin is to be of the fusible, crystalline type, it must not contain more than about 2% of a crosslinking comonomer (i. e., a plurality unsaturated comonomer in which the ethylenic groups are not conjugated or cross-conjugated) nor more than about 10–15% of any other comonomer. These last two restrictions do not apply, if fusible, crystalline resins are not desired. Suitable non-crosslinking comonomers are exemplified in vinyl compounds on the order of vinyl chloride, vinyl acetate, vinyl ethyl ether, vinyl β-chloroethyl ether, vinyl higher fatty ethers, vinyl phenyl ether, etc.; vinyl ketones such as vinyl methyl ketone, methyl isopropenyl ketone, vinyl phenyl ketone, etc., cyclic vinyl compounds such as styrene, α-methyl styrene, nuclearly chlorinated styrenes, p-vinyl benzoic acid, β-vinyl naphthalene, vinyl benzoate, vinyl carbazole, various vinyl pyridines, and the like; acrylic and substituted acrylic compounds such as methyl acrylate, methyl methacrylate, vinyl furane, ethyl chloroacrylate, methacrylonitrile, chloroacrylonitrile, acrylonitrile and the like; vinylidene halides such as vinylidene chloride, vinylidene bromide, 1-fluoro-1-chloroethylene; 1,1-dichloro-2,2-difluoro-ethylene; compounds bearing an active cyclic unsaturated carbon atom such as coumarone, indene, 4-methylene-1,3-dioxolane, substituted derivatives of this material, and the like. Examples of suitable conjugated and cross-conjugated copolymerizable compounds are butadiene, cyclopentadiene, chloroprene, 1-chlorobutadiene, isoprene, 2,3-dimethyl butadiene-1,3-piperylene, 2-methyl pentadiene, etc.

THE REACTION PRODUCT OF BISPHENOL-A AND SALICYLIC ACID

The reaction product of bisphenol-A and salicylic acid employed in this invention is produced by reacting together bisphenol-A, which is a known compound having the structure

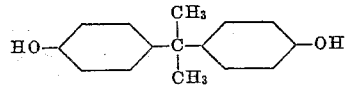

with salicylic acid under esterifying conditions. The product is believed to be a mixture of mono- and disalicylates of bisphenol-A having the respective formulae:

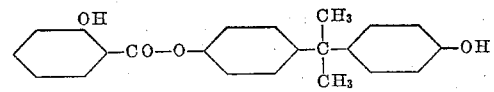

and

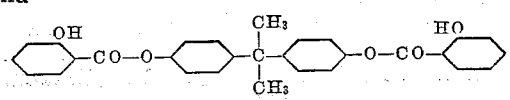

The reaction product is produced by reacting one mole of bisphenol-A with from 2 to 3 moles of salicylic acid under esterifying conditions. The esterifying conditions may be any ordinarily used for effecting esterification of aromatic acids and phenolic compounds and the reaction may be promoted by the presence of acid catalysts such as phosphorus oxychloride, sulfuric acid, anhydrous hydrogen chloride and the like. The esterification may be carried out over a wide range of temperatures, e. g. in the range 50°–200° C., and in the presence of inert solvents such as benzene, toluene, xylene and the like. The reaction is carried out to such an extent as to abstract between 1.5 and 2.0 moles of water for each mole of bisphenol-A employed.

Coming now to the amount of the bisphenol-A salicylic acid reaction product to be added to the dichlorobutadiene resin, as little as 0.5% of this material, based on the weight of the resin, will definitely enhance the resistance of the resin to discoloration and other deterioration by light. Increasing quantities, up to about 8%, will give still further enhanced stability. For most practical purposes, from 2 to 7% will provide an adequate degree of protection. Still greater quantities up to 20% may be employed, but will usually be found unnecessary and wasteful. All of the foregoing percentages are given on the basis of the weight of the resin.

With the foregoing general discussion in mind, there are given herewith detailed examples of the practice of this invention. All parts given are by weight.

EXAMPLE

A. Preparation of bisphenol-A salicylic acid reaction product

| | Parts |
|---|---|
| Bisphenol-A | 228 |
| Salicylic acid | 276 |
| Toluene | 215 |
| Phosphorus oxychloride ($POCl_3$) | 107.6 |

The above ingredients were charged into a reaction vessel provided with a heating jacket and a reflux condenser. The vessel was heated until refluxing commenced, which refluxing was continued for 15 hours. At the end of this time, the reaction mass was cooled to room temperature, and washed successively with deionized water, 5% aqueous sodium hydroxide solution, and again with deionized water. The mass was then dried over anhydrous sodium sulfate, and distilled to remove the solvent, leaving a product which was a sticky, viscous, clear, amber-colored liquid. This liquid was then subjected to molecular distillation, and fractions taken at temperatures and pressures as indicated hereinafter in Table I.

B. Preparation of 2,3-dichloro-1,3-butadiene polymers

| | Parts |
|---|---|
| Distilled water | 330 |
| 2,3-dichloro-1,3-butadiene | 100 |
| Alkyl sodium sulfonates [1] | 1.0 |
| Potassium persulfate | .02 |
| Thiophenol | 0.15 |

[1] "MP-189-EF," manufactured by E. I. du Pont de Nemours & Co. Sodium salts of the products of sulfonation of 10 to 16 carbon-atom paraffins under exposure to ultraviolet light. Free of electrolytes.

The above ingredients were charged under anaerobic conditions into a polymerization vessel and agitated at 30°–40° C. for 24 hours. The resultant latex was coagulated by addition of methanol, the coagulum dewatered by filtration, washed with water on the filter, and dried. The resultant pulverulent resin was employed as a base resin for stabilization tests as described hereinafter. This resin had an intrinsic viscosity, measured in ortho dichlorobenzene at 110° C., of 0.43.

C. *Preparation of stabilization test specimens*

|   | Parts |
|---|---|
| Dichlorobutadiene polymer (prepared as described under "B" above) | 100 |
| Acetone | 15 |
| Bisphenol-A-salicyclic acid reaction product, or fraction thereof prepared as described at A | 3 |
| Salicylate of 2,4-diamyl phenol | 5 |

A series of stabilization tests was run, using the reaction product of bisphenol-A and salicyclic acid prepared as above described, or molecular distillation fraction thereof as set forth in Table I hereinafter. In each test, the reaction product, 2,4-diamyl phenyl salicylate and the acetone were dissolved together, the dichlorobutadiene polymer was added to the solution and the entire mixture was thoroughly worked together. The mixture was then spread out into a thin layer and freed of the acetone by application of gentle heat. The salicylate was included as a plasticizer, as it has no great stabilizing action.

One-half gram of the blended resin, stabilizer and plasticizer was poured onto a sheet of aluminum foil to form a conical pile, a second sheet of aluminum foil placed on the pile to cover the same, and the assembly placed in a laboratory press having flat parallel platens heated to 180° C. The platens were quickly closed on the assembly, and left in light contact therewith for 10 seconds, after which a total load of 2460 pounds was applied to the platens and maintained for 30 seconds. The press was then quickly opened, the assembly removed and quenched in cold water and the foil sheets peeled off from the resultant fused plaque (usually about .005 inch thick) of resin and stabilizer. From this plaque were cut test specimens 2 inches long and .25 inch wide, which were subjected for varying periods of time to a light aging test as described below.

EXPOSURE OF TEST SPECIMENS

The test specimens prepared as above described were then subjected to exposure for various periods of time in a test substantially identical with the A. S. T. M. test D620-45T. For this test there is provided a General Electric sunlamp, Model BM12 equipped with a reflector approximately 15 inches in diameter at the lower rim, with a General Electric S-1 bulb which has been in operation at least 50 hours and less than 550 hours. The S-1 bulb consists of a combination tungsten filament and mercury arc enclosed in a Corex D glass envelope which absorbs most of the ultraviolet radiation below 2800 Å. The bulb is rated at 400 watts and operating voltage is maintained at 100±2 volts.

There is provided a circular plane turntable 17 inches in diameter revolving at 15 R. P. M. upon an axis through its center and perpendicular to its plane. The lamp is mounted coaxially with said axis, with the bottom of the bulb 7 inches from the center of the turntable. The test specimens are mounted flat on a white circular cardboard $\frac{1}{16}$ inch thick and 15 inches in diameter placed on the turntable concentric therewith. The specimens (a large number are run simultaneously) are disposed radially upon the cardboard, with their inner ends on a radius 3¾ inches from the center thereof. A circular cover card 4¾ inches in diameter is mounted on top of the specimens concentric with the turntable so as to cover the innermost half of the specimens.

At the end of the periods of exposure of the test specimens, they were removed and subjectively rated as to color by comparison with a series of standard colored specimens ranging from water-white to dark brown and arbitrarily rated from 0 for water-white to 10 for dark brown. Following are the results of these tests.

*Table I*

| Cut No. | Temperature (°C.) | Pressure (microns) | Wt. of cut (parts) | Color | State | Stability Test Color Rating After— | | | | | |
|---|---|---|---|---|---|---|---|---|---|---|---|
|   |   |   |   |   |   | 48 hrs. | 72 hrs. | 96 hrs. | 120 hrs. | 144 hrs. | 185 hrs. |
|   | original reaction product before distillation |   |   |   |   |   |   |   |   |   |   |
| 1 | 110 | 30 | 23 | light yellow | viscous liquid | 0 | 0+ | 1 | 1 | 2 | 3 |
| 2 | 110 | 25 | 15.3 | ----do---- | ----do---- | 0 | 0+ | 1 | 1 | 2 | 3 |
| 3 | 120 | 12 | 35.5 | yellow | ----do---- | 0 | 0+ | 1 | 1 | 2 | 3 |
| 4 | 130 | 13 | 25.1 | dark yellow | ----do---- | 0 | 0+ | 1 | 1 | 2 | 3 |
| 5 | 140 | 11 | 15.5 | ----do---- | liquid | 0 | 0+ | 1 | 1 | 2 | 3 |
| 6 | 150–180 | 12 | 25.2 | orange | solid | 0 | 0+ | 1 | 1 | 2 | 3 |
| 7 | 190 | 15 | 19.7 | ----do---- | ----do---- | 0 | 0+ | 1 | 1 | 2 | 3 |
| 8 | 200 | 14 | 16.6 | ----do---- | ----do---- | 0 | 0+ | 1 | 1 | 2 | 3 |
| 9 | 210 | 12 | 19.5 | ----do---- | ----do---- | 0 | 0+ | 1 | 1 | 2 | 3 |
| 10 | 220 | 13 | 28.9 | ----do---- | ----do---- | 0 | 0+ | 1 | 1 | 2 | 3 |
| 11 | 230 | 25 | 16 | light orange | ----do---- | 0 | 0+ | 1 | 1 | 2 | 3 |

It will be seen that all of the fractions, as well as the original undistilled reaction product, had substantially identical, and very excellent, stabilizing effect in the dichlorobutadiene resin. The reaction product is not readily amenable to analysis or elucidation, but appears to consist principally of the mono- and di-salicylates of bisphenol-A.

From the foregoing general discussion and detailed specific examples, it will be evident that this invention provides a novel and highly effective agent for stabilizing the dichlorobutadiene resins. The stabilizer of this invention may readily be synthesized from cheaply and readily procurable starting materials, and entails no special difficulties in compounding and use. The stabilizer is non-toxic and, so far as has been observed, has no irritating effect on the skin.

What is claimed is:

1. A light-stable composition of matter comprising (A) a resin selected from the group consisting of polymers of 2,3-dichloro-1,3-butadiene and copolymers thereof with other unsaturated compounds copolymerizable therewith containing at least 25% of 2,3-dichloro-1,3-butadiene copolymerized therein, together with (B) from 0.5% to 20%, based on the weight of said resin, of the product of reaction, under esterifying conditions, of bisphenol-A and salicyclic acid.

2. A light-stable composition of matter comprising a polymer of 2,3-dichloro-1,3-butadiene having an intrinsic viscosity from 0.1 to 1.5, together with from 0.5% to 20%, based on the weight of said polymer, of the product of reaction, under esterifying conditions, of bisphenol-A and salicylic acid.

3. A light-stable composition of matter comprising (A) a resin selected from the group consisting of polymers of 2,3-dichloro-1,3-butadiene and copolymers thereof with other unsaturated compounds copolymerizable therewith containing at least 25% of 2,3-dichloro-1,3-butadiene copolymerized therein, together with (B) from 0.5% to 20%, based on the weight of said resin, of bisphenol-A monosalicylate.

4. A light-stable composition of matter comprising (A) a resin selected from the group consisting of polymers of 2,3-dichloro-1,3-butadiene and copolymers thereof with other unsaturated compounds copolymerizable therewith containing at least 25% of 2,3-dichloro-1,3-butadiene copolymerized therein, together with (B) from 0.5% to 20%, based on the weight of said resin, of bisphenol-A disalicylate.

EUGENE P. STEFL.
LLOYD O. BENTZ.

No references cited.